United States Patent [19]

Shimomura

[11] Patent Number: 5,167,014

[45] Date of Patent: Nov. 24, 1992

[54] PRINTING APPARATUS

[75] Inventor: Haruyuki Shimomura, Nagoya, Japan

[73] Assignee: Brother Kogyo Kabushiki Kaisha, Aichi, Japan

[21] Appl. No.: 769,954

[22] Filed: Oct. 1, 1991

[30] Foreign Application Priority Data

Oct. 2, 1990 [JP] Japan ................................ 2-266029

[51] Int. Cl.⁵ ............................................ G06K 15/00
[52] U.S. Cl. ...................................... 395/111; 395/101
[58] Field of Search ........................ 395/101, 111, 116; 355/321, 317, 309, 308; 271/278, 306; 400/624, 625

[56] References Cited

U.S. PATENT DOCUMENTS 4,939,554 7/1990 Hirabayoshi et al. ............... 355/317
4,992,958 2/1991 Kageyama et al. .................. 395/116

FOREIGN PATENT DOCUMENTS 56-85762 7/1989 Japan .................................. 395/111

Primary Examiner—Arthur G. Evans
Attorney, Agent, or Firm—Kane, Dalsimer, Sullivan, Kurucz, Levy, Eisele and Richard

[57] ABSTRACT

In a printing apparatus, a control unit receives a next page printing data during the printing operation of the present paper. When the time needed for developing the printing data is shorter than the predetermined time, the control unit is controlled to drive a paper feeding delivery mechanism, and during the printing operation, the next paper is delivered to a print waiting position on a delivery path for waiting for printing.

12 Claims, 6 Drawing Sheets

A POINT BROTHER  
D POINT  
B POINT  
C POINT

| DEVELOPING GROUP 80 | PRINTING CHARACTERS, SETTING TOP MARGIN OR THE LIKE |
|---|---|
| DEVELOPING GROUP 82 | DRAWING LINES, WRITING CIRCLE |
| DEVELOPING GROUP 84 | BLACKING FIGURE, PRINTING ENLARGED LETTERS, OR THE LIKE |

| TIME TABLE | |
|---|---|
| DEVELOPING GROUP 80 | 1 msec |
| DEVELOPING GROUP 82 | 100 msec |
| DEVELOPING GROUP 84 | 10000 msec |

PRINTING APPARATUS

BACKGROUND OF THE INVENTION

The present invention relates to a printing apparatus such as a laser printer for performing printing by feeding, one by one, a piece of paper from a paper receiving portion to a printing mechanism by means of a paper feeding mechanism on the basis of a data information fed from a host computer.

Conventionally, in such a printing apparatus, a piece of paper on a delivery path is fed at a constant speed, and the information may be printed in synchronism between the paper feeding speed and a writing timing of information for the printing portion. In particular, in the case where the delivery path from the paper accommodating portion to the printing portion is long, if a subsequent piece of paper is fed from the paper accommodating portion to the printing portion after a printing operation, the waiting time for the printing would be long so that the printing speed of the printing apparatus as a whole would be low. Accordingly, in order to solve this problem, there has been provided a printing apparatus in which the next or subsequent paper is once fed from the paper accommodating portion to a print waiting position during the printing operation in the printing portion to be in preparation for the next printing operation. In some cases, even if a constant time has lapsed and a next printing command is not effected, the once fed paper is discharged in a constant period of time (see Japanese Patent Unexamined Publication No. 56-85762).

However, if the paper is held at the print waiting position for a long period of time, the paper would be deformed due to the shape of the delivery path which is generally curved to make the printing apparatus compact and the pressure imposed by the feeding rollers, so that a paper jamming would be likely to be generated. Also, in the case of the conventional system in which the paper is discharged in a constant period of time, the paper would be deformed due to the delivery of the paper along the delivery path. In this case, when the deformed paper is used again for the printing, the paper would be likely to be jammed during the printing period, disadvantageously.

SUMMARY OF THE INVENTION

In order to solve the above-described problems, an object of the present invention is to provide a printing apparatus for increasing the printing speed and for enhancing the reliability.

In order to attain this and other objects, according to the present invention, there is provided a printing apparatus for delivering a piece of paper and performing printing on the paper one by one on the basis of printing data fed from a host computer, the apparatus comprising: a paper feeding delivery mechanism for drawing the paper from a paper cassette and delivering the paper to a delivery path; a paper delivery controlling mechanism for controlling the paper feeding delivery mechanism and for temporarily stopping the paper in a print waiting position in the delivery path; and a control mechanism for receiving printing data for a next page from the host computer during a printing operation of the present paper, and controlling the paper delivery controlling mechanism, driving the paper feeding delivery mechanism and temporarily delivering the next paper and causing the next paper to wait during the printing operation when a time needed for developing the printing data into arranged printing data is shorter than a predetermined time.

In the structure, the control mechanism receives the next page printing data during the printing operation of the present paper. When the time needed for developing the printing data is shorter than the predetermined time, the control mechanism is controlled to drive the paper feeding delivery mechanism, and during the printing operation, the next paper is delivered to the print waiting position on the delivery path for waiting for printing. On the other hand, when the time needed for developing the printing data is longer than the predetermined time, the paper is not delivered to the print waiting position during the printing operation.

The paper feeding delivery mechanism comprises: an automatically paper feeding roller for drawing the paper from the paper cassette; a pair of delivery rollers for feeding the paper, drawn by the automatically paper feeding roller, into an interior of a printing apparatus body; and a pair of registance rollers disposed in the midway of the delivery path for delivering the paper into a printing portion while printing the paper.

The print waiting position is disposed in the delivery path between the delivery rollers and the registance rollers, and a paper detecting sensor for detecting whether or not the paper is located in the print waiting position is disposed in the print waiting position.

The position where the paper waits for printing is either the print waiting position or a position of the registance rollers.

The apparatus may further comprise a light sensitive drum disposed in the midway of the delivery path for printing on the paper fed from the registance rollers, a transfer material being temporarily adhered to the drum, the transfer material being transferred to the paper from the light sensitive drum in a printing portion to thereby forming an image thereon; a pair of fixing rollers disposed in the midway of the delivery path for passage therebetween of the paper on which the printing has been effected, the paper being passed between the pair of fixing rollers whereby the transfer material is thermally fixed onto the paper; and a paper discharge tray mounted on an outer portion of the printing apparatus body, the paper in which the fixing has been effected being discharged onto the discharge tray and received therein.

The paper delivery controlling mechanism comprises: the paper detecting sensor; a paper feeding solenoid controlling circuit for switching on and off a paper feeding solenoid for controlling the paper feeding roller and the delivery rollers; a registance solenoid controlling circuit for switching on and off a registance solenoid for controlling the registance rollers; and a main motor controlling circuit for driving and controlling a main motor.

The predetermined time is approximately one minute.

The controlling mechanism comprises: a CPU, and a ROM and a RAM for receiving and issuing a signal from and to the CPU through a bus, the bus being connected to the host computer and the paper delivery controlling mechanism.

The ROM comprises: a programming portion; developing groups including a plurality of developing programming routine portions; and a time table storing values of processing time of the respective developing groups.

The first developing group performs printing of characters or letters and setting of a top margin, a processing time thereof being approximately one msec; the second developing group performing one of drawing a line or writing a circle, a processing time thereof being approximately 100 msec; and the third developing group performing blacking an image or printing enlarged letters, a processing time thereof being approximately 10,000 msec.

The RAM may comprise: a memory portion; a data memory for storing printing data from the host computer; a developing memory for storing data after the printing data from the host computer have been developed into arranged printing data; and a time memory for storing a time needed for developing the data.

According to the present invention, there is provided a controlling method for controlling the printing apparatus, comprising: a first step of waiting for feeding of the printing data corresponding to one page when the printing data are fed from the host computer; a second step of developing the printing data into the arranged printing data after the feeding of the printing data corresponding to one page has been terminated, and picking up a value of time needed for the development by using the developing groups and adding the value to the time memory before the feeding of the printing data have been terminated; a third step of turning on the main motor after the feeding of the printing data corresponding to one page have been terminated, at the same time, turning on the paper feeding solenoid to thereby driving the automatically paper feeding roller and the delivery rollers to deliver the paper, detecting with the paper detecting sensor whether the paper reaches the print waiting position, and temporarily stopping the paper in the waiting position; a fourth step of turning on the registance solenoid after the development of the printing data has been effected, driving the registance rollers, beginning a sequence of the printing operation by feeding the paper to the printing portion; a fifth step of performing the process of the second step with respect to the next page printing data during a period for waiting the state where the paper in the present printing operation has not been detected in the waiting position, and turning on the paper feeding solenoid, driving the automatically paper feeding roller and the delivery rollers, feeding a next piece of paper for the next page during the printing operation after the paper has not been detected when the value of time of the time memory set in the process in the second step is shorter than the predetermined time, and stopping the rollers, and causing the paper to wait after the paper has been detected in the waiting position; and a sixth step of judging whether or not the development of the printing data of the next page is terminated, and when the development has been terminated, returning to the fourth step after temporarily stopping the next paper in the print waiting position.

BRIEF DESCRIPTION OF THE DRAWINGS

In the accompanying drawings:

FIG. 1 is a schematic view showing a laser printer as a printing apparatus according to one embodiment of the invention;

FIG. 2 is a block diagram showing a control unit of the laser printer shown in FIG. 1;

FIGS. 3 and 4 are flowcharts of a main routine showing a process control of the paper feeding operation of the printing apparatus according to the invention;

FIG. 5 is a flowchart showing an interruption process of the process control of the paper feeding operation;

FIG. 6 is an illustration of the print example;

FIG. 7 is a table showing the process contents of the respective developing groups of ROM; and FIG. 8 is a time table showing the process time of the developing groups shown in FIG. 7.

DETAILED DESCRIPTION OF THE PREFERRED EMBODIMENTS

One embodiment of the invention will now be described with reference to FIGS. 1 to 8.

Figure 1:
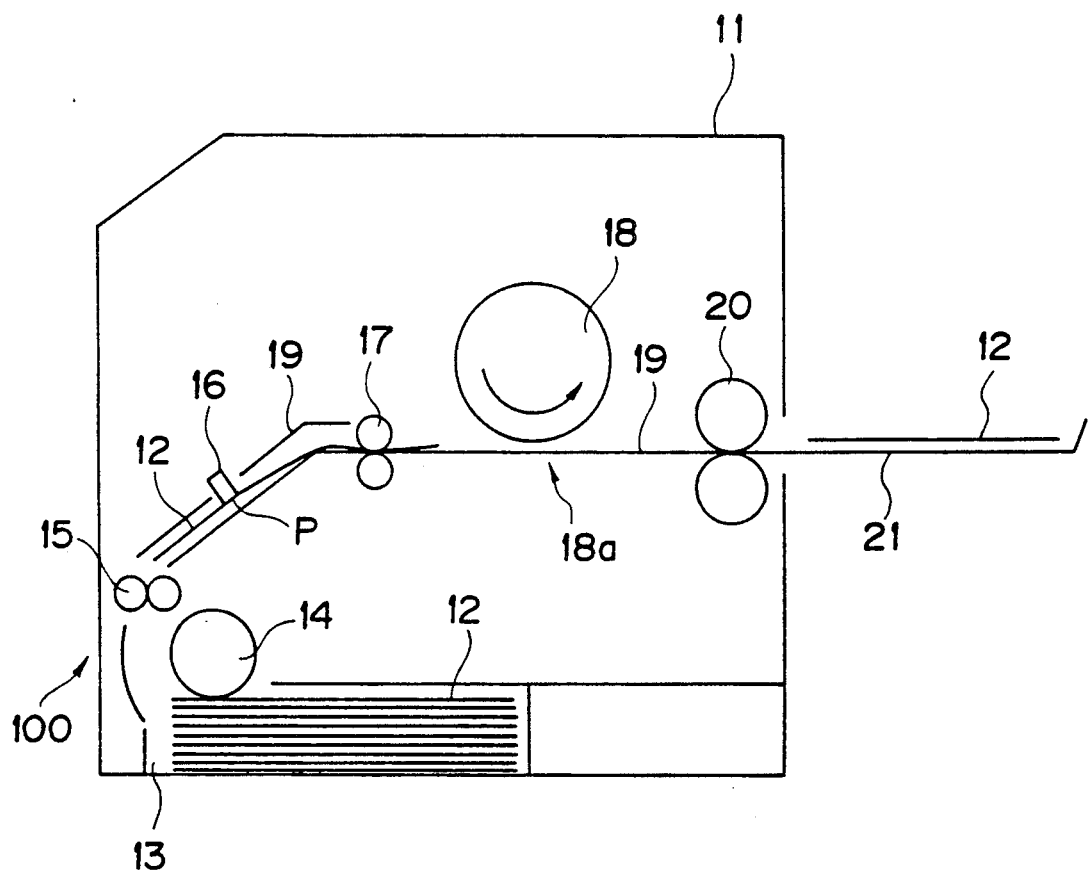
FIGS. 1 through 8 show one embodiment of the invention.

FIG. 1 schematically shows a printing apparatus, i.e., a laser printer in accordance with one embodiment of the invention. A paper cassette 13 in which a number of pieces of paper 12 for printing are received or accommodated is disposed at a lower portion of a laser printer body 11 of the printing apparatus. The paper 12 is drawn from the paper cassette 13 by an automatically paper feeding roller 14 and is further fed into an interior of the laser printer body 11 by a pair of delivery rollers 15. The delivered paper 12 is fed to a printing portion 18a of a light sensitive drum 18, on which a transfer material formed by a series of processes such as an electrophotographic process is disposed, while the paper is being registered by a pair of registance rollers 17 disposed 12 in a midway of a delivery path 19 along which the paper 12 is to be moved. On the other hand, a print waiting position P for the paper 12 is set in the delivery path 19 between the delivery rollers 15 and the registance rollers 17. A paper detecting sensor 16 is disposed in the delivery path 19 for detecting whether or not the paper 12 is located at the print waiting position P.

At the printing portion 18a of the light sensitive drum 18, the transfer material such as tonner temporarily adhered to the drum 18 is transferred to a surface of the paper 12 to thereby form an image on the paper 12. Further, the paper 12 to which the image has been transferred is moved between a pair of fixing rollers 20 so that the transfer material is thermally fixed onto the paper 12. Then, the paper 12 is discharge to a discharge paper tray 21 mounted on an outer rear portion of the laser printer body 11.

Figure 2:
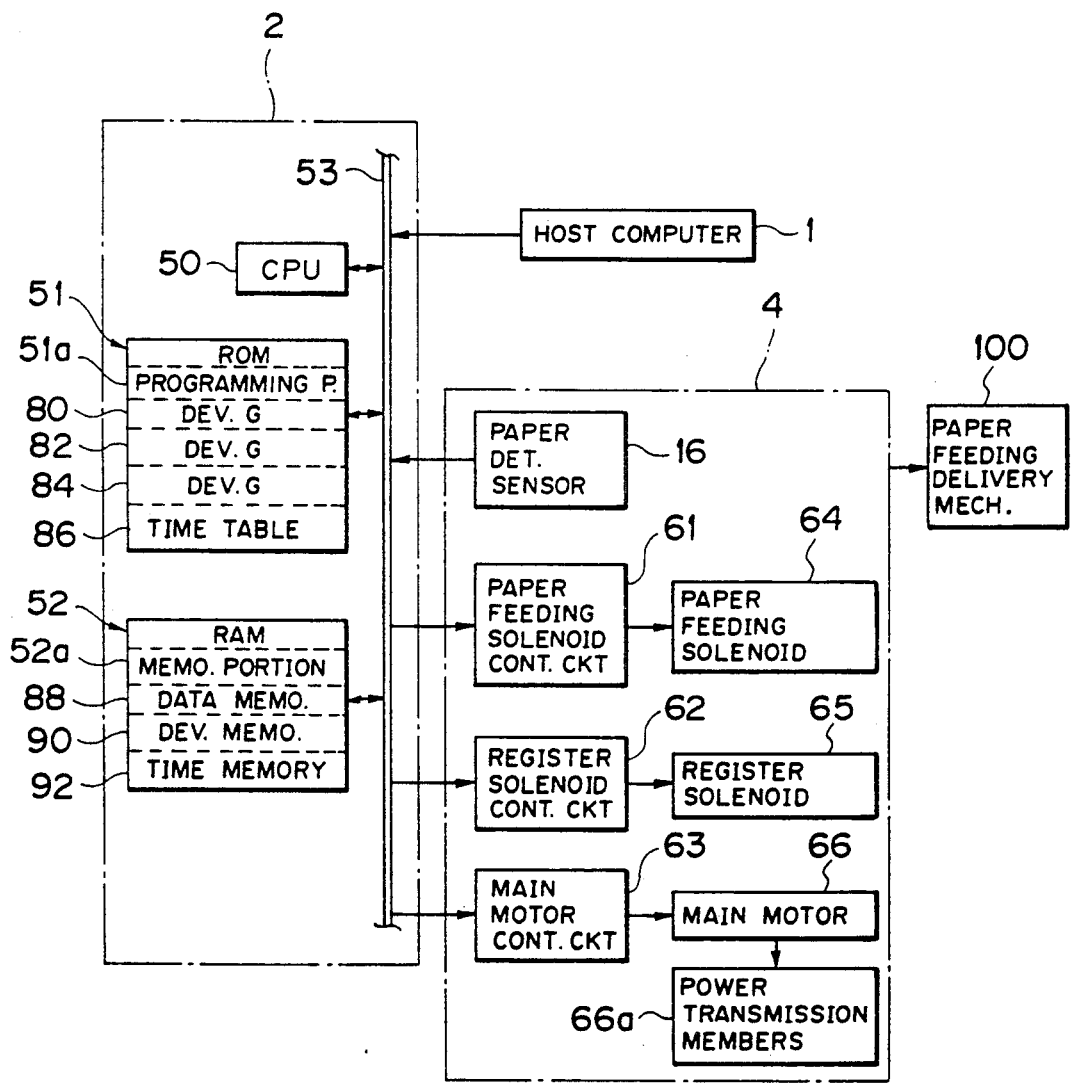

A control unit for the laser printer will be explained with reference to FIG. 2.

The control unit is mainly composed of a microcomputer 2 as a control means having a ROM 51 (read only memory) and a RAM 52 (random access memory) for signal communication through a bus 53 in both directions with respect to a CPU 50 (central processing unit). Printing data is inputted from a host computer 1 to the microcomputer 2, thereby drivingly controlling a paper delivery control unit 4 for printing.

Further, the microcomputer 2 receives printing data of the next page during the printing operation of the present paper 12 from the above-mentioned host computer 1. The microcomputer 2 drives a paper feeding delivery mechanism 100 to be described later by controlling a paper delivery control means to be described later during the printing operation to thereby cause the next paper 12 to be delivered for waiting for printing for the next page, only when a time needed for developing the printing data to some arranged printing data is shorter than a predetermined period of time (To).

The ROM 51 includes a programming portion 51a, developing groups 80, 82 and 84 having a plurality of developing programming routines, and a time table 86 for storing values of processing time of the respective developing groups 80, 82 and 84. The RAM 52 includes a memory portion 52a, a data memory 88 for storing data from the host computer 1, a developing memory 90 for storing the arranged printing data after the printing data from the host computer 1 has been developed into the arranged printing data by the CPU 50, and a time memory 92 for storing a period of time needed for developing the data.

The paper delivery controlling unit 4 is connected to the microcomputer 2. The paper delivery controlling unit 4 serves to drive the paper feeding delivery mechanism 100 so that the paper 12 is temporarily stopped in the print waiting position P. The paper delivery controlling unit 4 includes a paper feeding electric solenoid controlling circuit 61 for switching on and off a paper feeding solenoid 64; a registance solenoid controlling circuit 62 for switching on and off a registance solenoid 65; and a main motor controlling circuit 63 for drivingly controlling a main motor 66.

The main motor 66 serves to drive, through power transmission members 66a such as gears and belts, the light sensitive drum 18, the fixing roller 20, the automatic paper feeding roller 14, the delivery rollers 15 and the registance rollers 17. It should be noted that the automatically paper feeding roller 14 and the delivery rollers 15 are rotated by the power from the main motor 66, only when the paper feeding solenoid 64 is driven. Also, the registance rollers 17 are rotated by the power from the main motor 66 in the same manner only when the registance solenoid 65 is driven.

The paper feeding delivery mechanism 100 is composed of the automatically paper feeding roller 14, the delivery rollers 15 and the registance rollers 17. The paper 12 is drawn from the paper cassette 13 and delivered along the delivery path 19 by the paper feeding delivery mechanism 100 to be moved to the printing portion 18a of the light sensitive drum 18.

The paper feeding delivery operation of the laser printer will be described with reference to a flowchart of a main routine shown in FIGS. 3 and 4 and a flowchart of an interruption process shown in FIG. 5.

Figure 3:
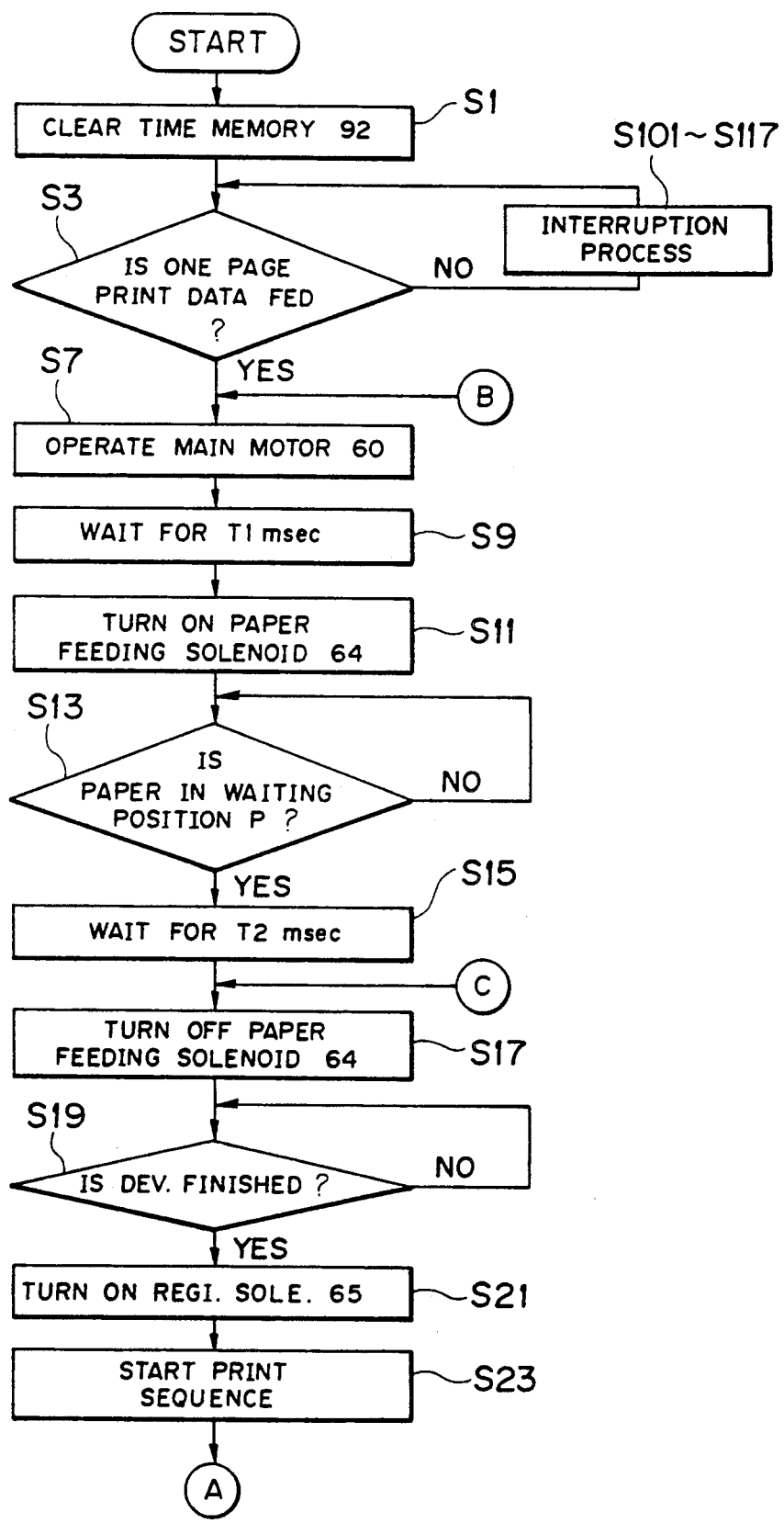
Figure 4:
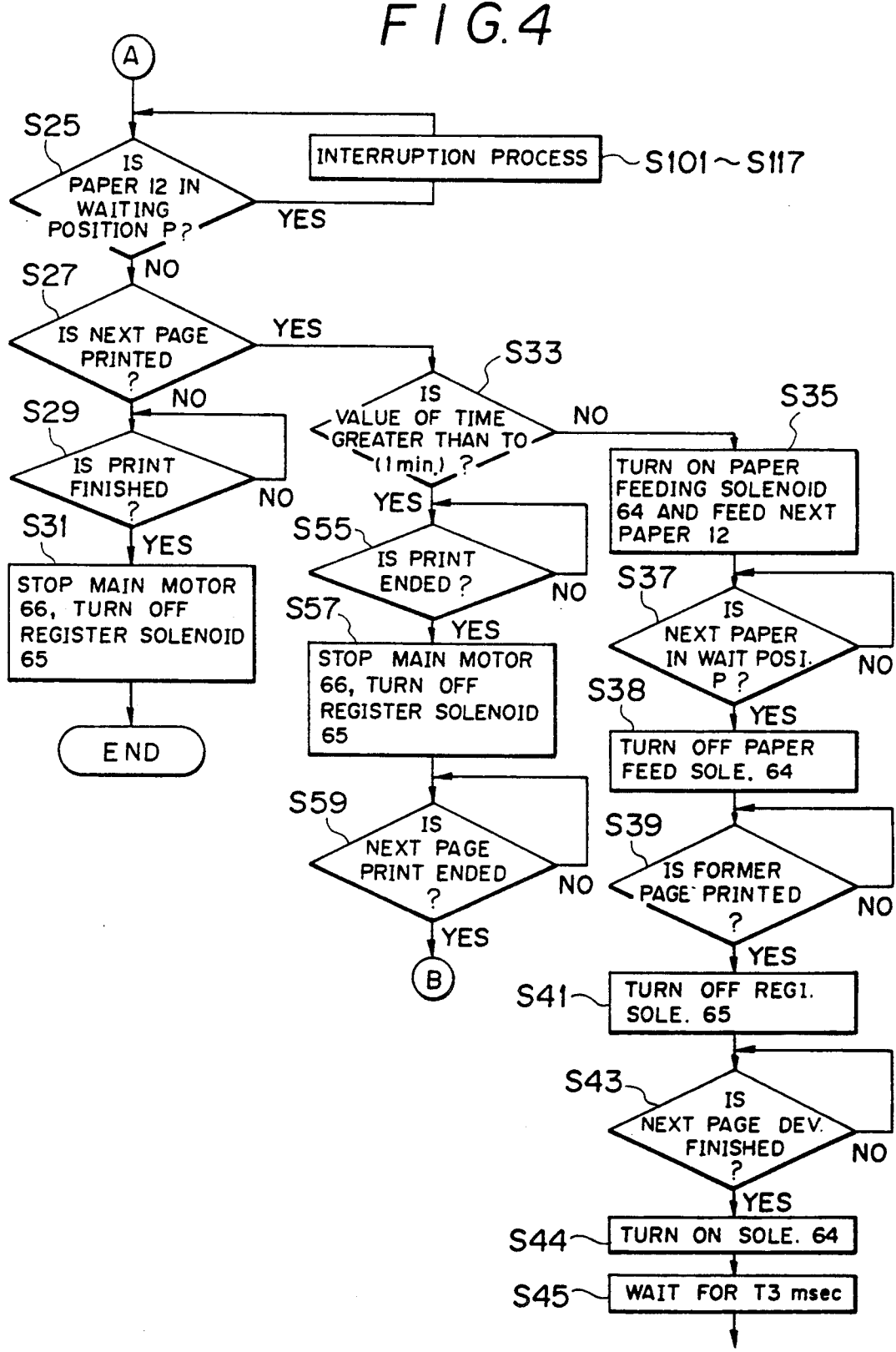

In the flowchart shown in FIGS. 3 and 4, first of all, the above-described time memory 92 is cleared up (step S1). Subsequently, when the printing data is fed from the host computer 1, the apparatus waits for the printing data corresponding to one page (step S3).

Figure 5:
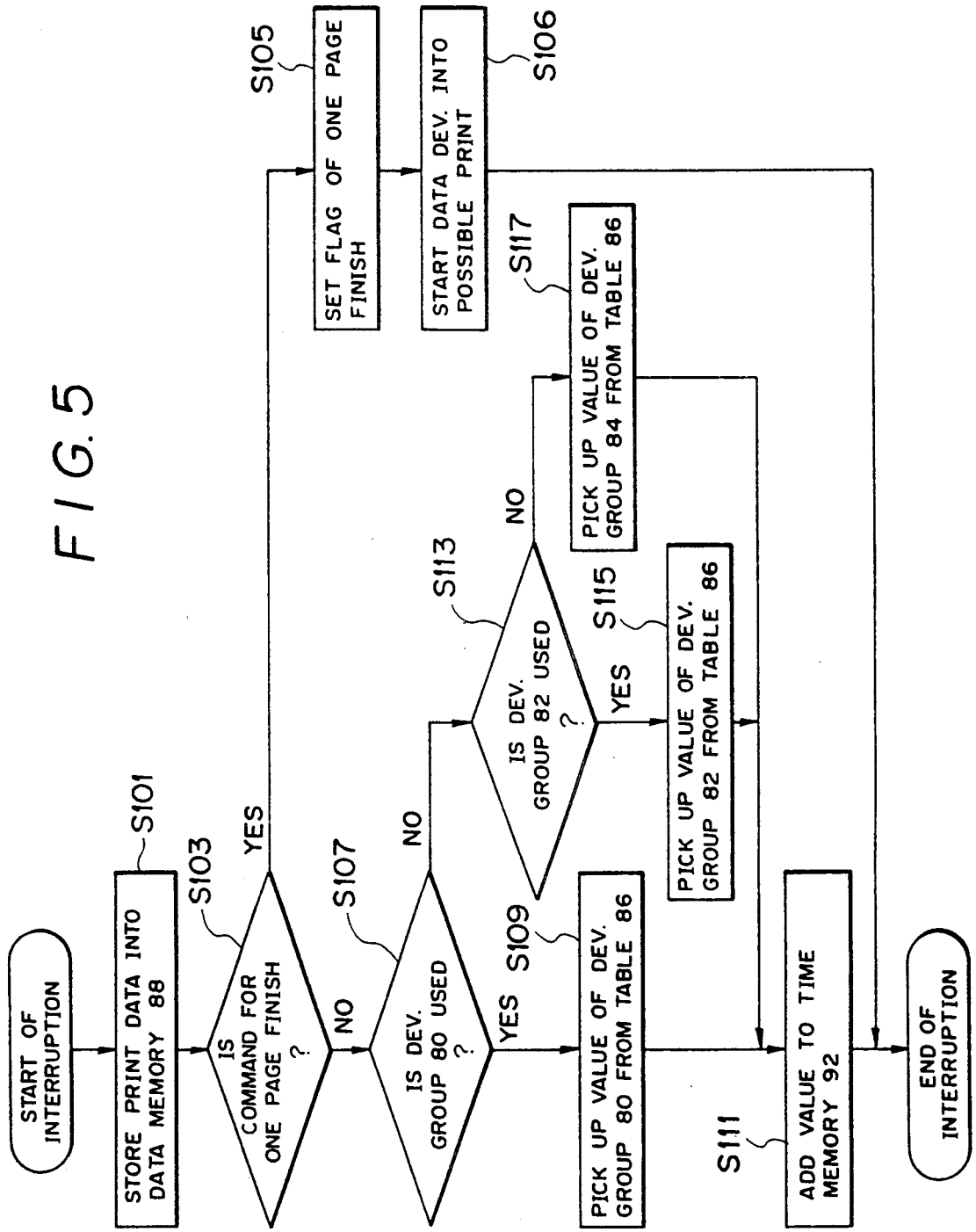

Immediately after the feeding of the printing data from the host computer 1 has been started, the operation is to enter into the flowchart of the interruption process (steps S101 to S117) shown in FIG. 5. Then, during the waiting for the feeding of the printing data, corresponding to one page, from the host computer 1, the fed printing data is stored in the data memory 88 by the interrupt process shown in FIG. 5 (step S101). Then, it is judged whether the printing data is a command for indicating the finish of one page or not (step S103). If the data is the command corresponding to the one page finish (YES in step S103), a one page finish flag is set (step S105), the development of the printing data into the arranged printing data is started (step S106), and the interruption process is ended.

If the printing data is not the one page finish command (NO in step S103), it is judged which one of the developing groups 80, 82 and 84 of the ROM 51 should be used for developing the data. Namely, first of all, it is judged whether the developing group 80 should be used or not (step S107). In the case where the developing group 80 should be used, a value of time needed for developing the data is picked up from the time table 86 (step S109), and the value is added to the time memory 92 (step S111). Unless the developing group 80 is not used, it is judged whether the developing group 82 should be used or not (step S113). In the case where the group 82 should be used, a value of time needed for developing the data is picked up from the time table 86 (step S115), and the value is added to the time memory 92 (step S111). If the developing group 82 is not used in the step S113, the developing group 84 is used, and a value of time needed for developing the data is picked up from the time table 86 (step S117). The value is added to the time memory 92 (step S111). At the time when the above-described value of time has been added to the time memory 92, the interruption process is terminated.

Turning to the flowchart of FIG. 3, when the one page printing data is fed (YES in step S3), the following printing operation will be performed. First of all, the main motor 66 is driven in accordance with a signal from the main motor controlling circuit 63 (step S7) for waiting for $T_1$ msec (milliseconds) (step S9). When the rotation of the main motor 66 is kept constant, the paper feeding solenoid 64 is turned on in accordance with a signal from the paper feeding solenoid controlling circuit 61 (step S11), and the paper 12 is fed into the interior of the laser printer body 11 while being drawn from the paper cassette 13 by driving the automatically paper feeding roller 14 and the delivery rollers 15. The operation waits for the state where the leading edge of the paper 12 is detected by the paper detecting sensor 16 in the waiting position P (step S13). When the paper 12 is detected in the waiting position P by the sensor 16, the operation waits for $T_2$ msec (step S15) and the paper feeding solenoid 64 is turned off to stop the rollers 14 and 15 (step S17). At this time, the leading edge of the paper 12 reaches the registance rollers 17 (in the state shown in FIG. 1). Thereafter, the operation waits for the termination of the developing process of the printing data (step S19). When the printing data has been developed, the registance solenoid 65 is turned on in accordance with a signal from the registance solenoid controlling circuit 62 (step S21), the paper 12 is fed to the printing portion 18a by driving the registance rollers 17, and the printing sequence is started (step S23).

When the printing operation is started onto the present paper 12, as shown in FIG. 4, the operation waits for the state where the present paper 12 is not detected in the waiting position P after passage of the paper through the waiting position by the paper detecting sensor 16 (step S25). During this period for waiting the non-detection of the paper, again in accordance with the flowchart shown in FIG. 5, the interruption process for the next page printing data is effected (steps S101 to S117). When the present paper 12 is not present in the print waiting position P, it is judged whether or not the next page is printed (step S27). When the next page data is not present (NO in step S27), the operation waits for the termination of the printing of the present paper 12 which is being printed (step S29). After the completion of the printing, the main motor 66 is stopped and the registance solenoid 65 is turned off, thereby completing the process (step S31).

When the next page is printed (YES in step S27), it is judged whether or not the value of time of the time memory 92 set through the above-described interruption process is longer than the predetermined time (To) (e.g., approximately one minute) (step S33). When the value is shorter than one minute (NO in step S33), the paper solenoid 64 is turned on (step S35), and the automatically paper feeding roller 14 and the delivery rollers 15 are driven so that the next paper 12 for the next page is drawn from the paper cassette 13 for paper feeding. Thereafter, as described before, the operation waits for the state where the leading edge of the next paper 12 is detected in the print waiting position P by the paper detecting sensor 16 (step S37). When the leading edge is detected, the paper feeding solenoid 64 is turned off (step S38), and the rollers 14 and 15 are stopped for causing the paper 12 to wait for the completion of the printing operation of the former page, i.e., the present printing operation. After the completion, the registance solenoid 65 is turned off for stopping the registance rollers 17 (step S41).

Subsequently, it is judged whether or not the development of the next page printing data is completed (step S43). When the development is completed, the paper feeding solenoid 64 is turned on in order to move the leading edge of the second paper (i.e., next paper 12) from the print waiting position P to the registance rollers 17 (step S44) by driving the rollers 14 and 15, and the operation waits for $T_3$ msec (step S45) for feeding the leading edge of the next paper 12 to the registance rollers 17 (see the state shown in FIG. 1). Thereafter, the operation is returned to step S17 and a similar operation is repeated.

When the value of the time memory 92 set through the interrupion process is longer than one minute (YES in step S33), the operation waits for the completion of the printing of the paper 12 during the present printing operation (step S55). After the completion, the main motor 66 is stopped, and the registance solenoid 65 is turned off (step S57). Thereafter, the operation waits for the completion of the data development of the next page, and when completed, the operation is returned to step S7. Then, a similar operation will be repeated.

Figures 6, 7, 8:
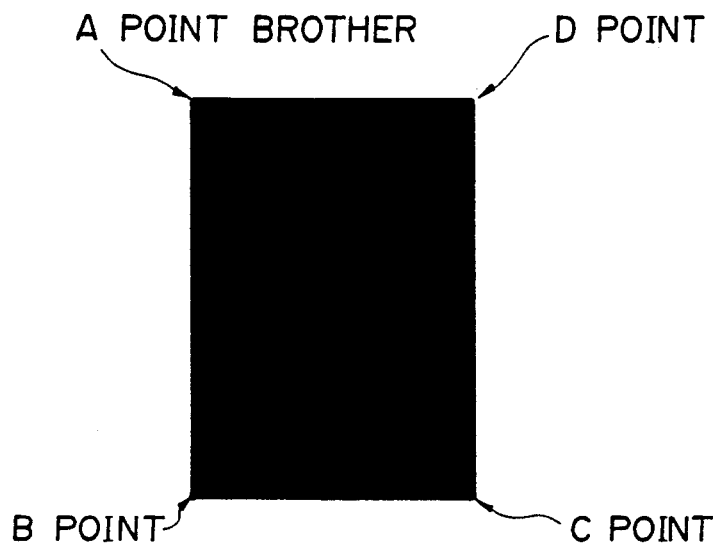

An embodiment of the calculation operation of the development time through the above-described process in case of the printing operation of the data exemplified in FIG. 6 will be described. When the printing operation of the letters and images shown in FIG. 6 is performed, first of all, the characters "BROTHER" are printed. Then, the straight line is drawn from a point (A) to a point (B), from the point (B) to a point (C), from the point (C) to a point (D) and from the point (D) to the point (A) in this order. Furthermore, the data for blacking the rectangular region defined by these lines is fed to thereby enable the printing operation of the letters and the images shown in FIG. 6.

FIGS. 7 and 8 show the process contents of the developing groups 80, 82 and 84 of the ROM 51 and the process time thereof. As is apparent from the charts, for example, the printing of the characters "BROTHER" or the setting of the top margin is performed by the developing group 80, and the process time of the developing group 80 is, for example, approximately one msec. Namely, it takes one msec to print the letter "B". In the same way, it takes one msec to print each letter of "R", "O", "T", "H", "E" and "R". With respect to other commands, in the same way, the developing group 82 serves to draw a straight line from the point (A) to the point (B), and the process time of the developing group 82 is, for example, approximately 100 msec. It takes also 100 msec to draw the straight line from the point (B) to the point (C), from the point (C) to the point (D), and from the point (D) to the point (A), respectively. The developing group 84 serves to black the figure region defined by the lines and prints an enlarged letter. The process time of the developing group 84 is, for example, approximately 10,000 msec. Accordingly, the process time as a whole for the letters and images is given by the following equation:

$$10,000 \text{ msec} + 100 \times 4 \text{ msec} + 1 \times 7 \text{ msec} = 10,407 \text{ msec}.$$

Thus, the total of the time value is 10,407 msec. That is, it takes approximately 10 seconds to develop the data. This time value is stored in the time memory 92 of the RAM 52.

As described above, according to the present invention, during the printing operation, printing data of the next page is received, and when the time needed for developing the printing data is shorter than the predetermined time (To), the paper delivery controlling unit 4 is driven to drive the paper delivery mechanism 100, and the paper 12 is delivered to the print waiting position P in the delivery path 19 during the printing operation to thereby avoid the deformation of the paper 12 and the paper jamming.

It is apparent that the invention is not limited to the above-described embodiment but a variety of modifications are possible. For instance, although, in the embodiment, the time for development is judged by all developing groups 80, 82 and 84 including a plurality of developing programming routines, it is possible to judge the development time by a single developing programming routine. In addition, the development of the data to the arranged printing data may be made on the basis of point data other than point data finally indicated "1" and "0".

The predetermined time (To) needed for developing the data for judging whether the paper 12 should be delivered or not is limited to one minute but it is possible to make it variable in accordance with the kind and characteristic of the paper 12. Also, it is possible to set a plurality of predetermined time periods (To) for development. It is possible not only to stop the main motor 16 but also to do the fixing rollers 20. Also, the position where the next paper 12 is delivered to wait for the printing operation is not limited to the above-described waiting position P but may be a position where the leading edge of the paper 12 reaches the registance rollers 17.

Also, the timing for feeding the paper 12 (step S35) is determined on a condition that the paper is not detected by the paper detecting sensor 16 (step S25) but may be determined on a condition that the previous paper is fed out of the print waiting position P.

Furthermore, in the printer where it is possible to manually insert the paper, when the paper 12 is located in the print waiting position P, it is sufficient to prohibit the insertion of the manual insertion of the paper.

As described above, according to the present invention, during the printing operation, the next page printing data is received, and when the time needed for developing the printing data is shorter than the predetermined time (To), the paper delivery controlling unit 4 is driven to drive the paper delivery mechanism 100 so that the paper 12 is temporarily delivered to the print waiting position P in the delivery path 19 during the printing operation. Accordingly, it is possible to increase the printing speed without the deformation of the paper, thereby avoiding the paper jamming, thus enhancing the reliability of the operation.

I claim:

1. A printing apparatus for delivering a piece of paper and performing printing on the paper one by one on the basis of printing data fed from a host computer, characterized by:
   a paper feeding delivery mechanism for drawing the paper from a paper cassette and delivering the paper to a delivery path;
   a paper delivery controlling means for controlling the paper feeding delivery mechanism and for temporarily stopping the paper in a print waiting position in the delivery path; and,
   a control means for receiving printing data for a next page from said host computer during a printing operation of the present paper, including a time memory for storing a time needed for developing the printing data for the present paper into arranged printing data and controlling said paper delivery controlling means on the basis of the time stored in said time memory in such a manner that a next paper is delivered to a print waiting position to wait there during the printing operation when a time needed for developing the printing data into arranged printing data is shorter than a predetermined time, and that the next paper is not delivered to said print waiting position when the time needed for developing the printing data for the present paper is not shorter than said predetermined time.

2. The apparatus according to claim 1, wherein said paper feeding delivery mechanism comprises:
   an automatically paper feeding roller for drawing the paper from said paper cassette;
   a pair of delivery rollers for feeding the paper, drawn by said automatically paper feeding roller, into an interior of a printing apparatus body through said print waiting position; and
   a pair of registance rollers disposed in a midway of said delivery path for delivering the paper into a printing portion while printing the paper.

3. The apparatus according to claim 2, wherein said print waiting position is disposed in said delivery path between said delivery rollers and said registance rollers, and a paper detecting sensor for detecting whether or not said paper is located in said print waiting position is disposed in said print waiting position.

4. The apparatus according to claim 3, wherein a position where said paper is stopped to wait is either said print waiting position or a position of said registance rollers.

5. The apparatus according to claim 2, further comprising:
   a light sensitive drum disposed in the midway of said delivery path for printing on the paper fed from said registance rollers, a transfer material being temporarily adhered to said drum, said transfer material being transferred to said paper from said light sensitive drum to thereby forming an image thereon;
   a pair of fixing rollers disposed in the midway of said delivery path for fixing the image on said paper when said paper is passed between said pair of fixing rollers; and
   a paper discharge tray mounted on an outer portion of said printing apparatus body for receiving said fixed paper.

6. The apparatus according to claim 1, wherein said paper delivery controlling means comprises:
   a paper detecting sensor for detecting whether or not said paper is located in said print waiting position;
   a paper feeding solenoid controlling circuit for switching on and off a paper feeding solenoid for controlling a paper feeding roller for drawing the paper from said paper cassette and a pair of delivery rollers for feeding the paper drawn by said roller into an interior of a printing apparatus body;
   a registance solenoid controlling circuit for switching on and off a registance solenoid for controlling a pair of registance rollers disposed in a midway of said delivery path for delivering the paper into a printing portion while printing the paper; and
   a main motor controlling circuit for driving and controlling a main motor.

7. The apparatus according to claim 1, wherein said predetermined time is approximately one minute.

8. The apparatus according to claim 1, wherein said controlling means comprises:
   a CPU; and
   a ROM and a RAM for receiving and issuing a signal from and to said CPU through a bus, said bus being connected to said host computer and said paper delivery controlling means.

9. The apparatus according to claim 8, wherein said ROM comprises:
   a programming portion;
   a first, a second and a third developing groups each including a programming routine portion; and
   a time table for storing values of processing time of the respective developing groups.

10. The apparatus according to claim 9, wherein said first developing group performs printing of characters or letters and setting of a top margin, a processing time thereof being approximately one msec;
    said second developing group performing drawing a line or writing a circle, a processing time thereof being approximately 100 msec; and
    said third developing group performing blacking an image or printing enlarged letters, a processing time thereof being approximately 10,000 msec.

11. The apparatus according to claim 9, wherein said RAM comprises:
    a memory portion;
    a data memory for storing printing data from a host computer;
    a developing memory for storing data after the printing data from said host computer has been developed into arranged printing data; and
    said time memory.

12. A controlling method for controlling the printing apparatus according to claim 11, said method comprising:
    a first step of waiting for feeding of printing data corresponding to one page when the printing data is fed from said host computer;
    a second step of developing the printing data into the arranged printing data after feeding of the printing data corresponding to one page has been terminated, and picking up a value of time needed for the development from the time table by using a plurality of developing groups and adding the value to the time memory before the feeding of the printing data has been terminated;

a third step of turning on a main motor after the feeding of said printing data corresponding to one page has been terminated, at the same time, turning on a paper feeding solenoid to thereby driving an automatically paper feeding roller and a pair of delivery rollers to deliver a pair of paper, detecting with a paper detecting sensor whether said paper reaches a print waiting position, and temporarily stopping said paper in said waiting position;

a fourth step of turning on said regISTANCE solenoid after development of said printing data has been effected, driving a pair of regISTANCE rollers, beginning a sequence of the printing operation by feeding said paper to a printing portion;

a fifth step of performing the process of said second step with respect to next page printing data during a period for waiting a state where said paper in the present printing operation has not been detected in said print waiting position, and turning on said paper feeding solenoid, driving said automatically paper feeding roller and said delivery rollers, feeding a next piece of paper for a next page during the printing operation after the paper has not been detected when said value of time of said time memory set in the process in said second step is shorter than said predetermined time, and stopping said rollers and causing the paper to wait after said paper has been detected in said print waiting position; and a sixth step of judging whether or not the development of the printing data of the next page is terminated, and when the development has been terminated, returning to said fourth step after temporarily stopping the next paper in said print waiting position.

* * * * *